United States Patent [19]

Pruente et al.

[11] 4,432,522
[45] Feb. 21, 1984

[54] PORTABLE TELEPHONE SUPPORT

[75] Inventors: Thomas F. Pruente; Anna Tamargo, both of Pontiac, Mich.

[73] Assignee: St. Joseph Mercy Hospital Pontiac, Pontiac, Mich.

[21] Appl. No.: 349,187

[22] Filed: Feb. 17, 1982

[51] Int. Cl.³ .............................................. A47B 96/06
[52] U.S. Cl. .................. 248/215; 179/146 R; 5/503
[58] Field of Search .................. 248/215, 225.1, 224.3, 248/314, 225.2; 211/87, 88; 5/503, 508; 179/146 R, 154, 157

[56] References Cited

U.S. PATENT DOCUMENTS

| 118,791 | 9/1871 | Calvert | 29/85 |
|---|---|---|---|
| 1,575,270 | 3/1926 | Jankowsky | 248/225.1 X |
| 1,778,568 | 10/1930 | Schulte | 248/314 X |
| 2,530,892 | 11/1950 | Mayo | 248/224.3 X |
| 2,572,797 | 10/1951 | Zimmer | 211/87 |
| 2,938,696 | 5/1960 | Hinshaw | 248/215 |
| 3,471,656 | 10/1969 | Quigley | 179/146 R |
| 3,653,624 | 4/1972 | Abel | 248/312 |
| 3,802,657 | 4/1974 | Jackson | 179/146 R |
| 4,203,175 | 5/1980 | Heine | 5/503 |
| 4,250,356 | 2/1981 | Hammer | 179/146 R |
| 4,355,212 | 10/1982 | Kosten | 179/146 R X |

Primary Examiner—Ramon S. Britts
Assistant Examiner—Sarah A. Lechok
Attorney, Agent, or Firm—Basile, Weintraub & Hanlon

[57] ABSTRACT

A portable telephone support for use by bedridden individuals. The device of the present invention comprises a telephone base support of planar configuration, a bedrail engaging hook secured to the base support which is adapted to releasably engage a bedrail, and a wall mounted bracket to releasably mount the telephone support against the wall when not mounted to the bed. The bedrail engaging hook includes an outwardly inclined lower end adapted to aid the hook in passing the edge of a mattress without interference.

6 Claims, 7 Drawing Figures

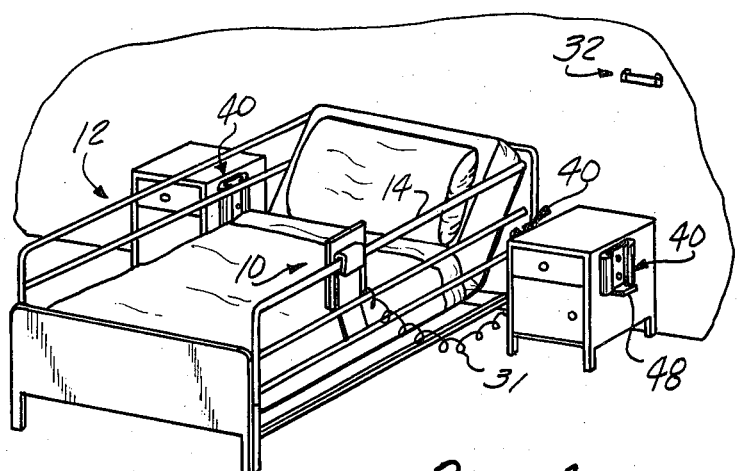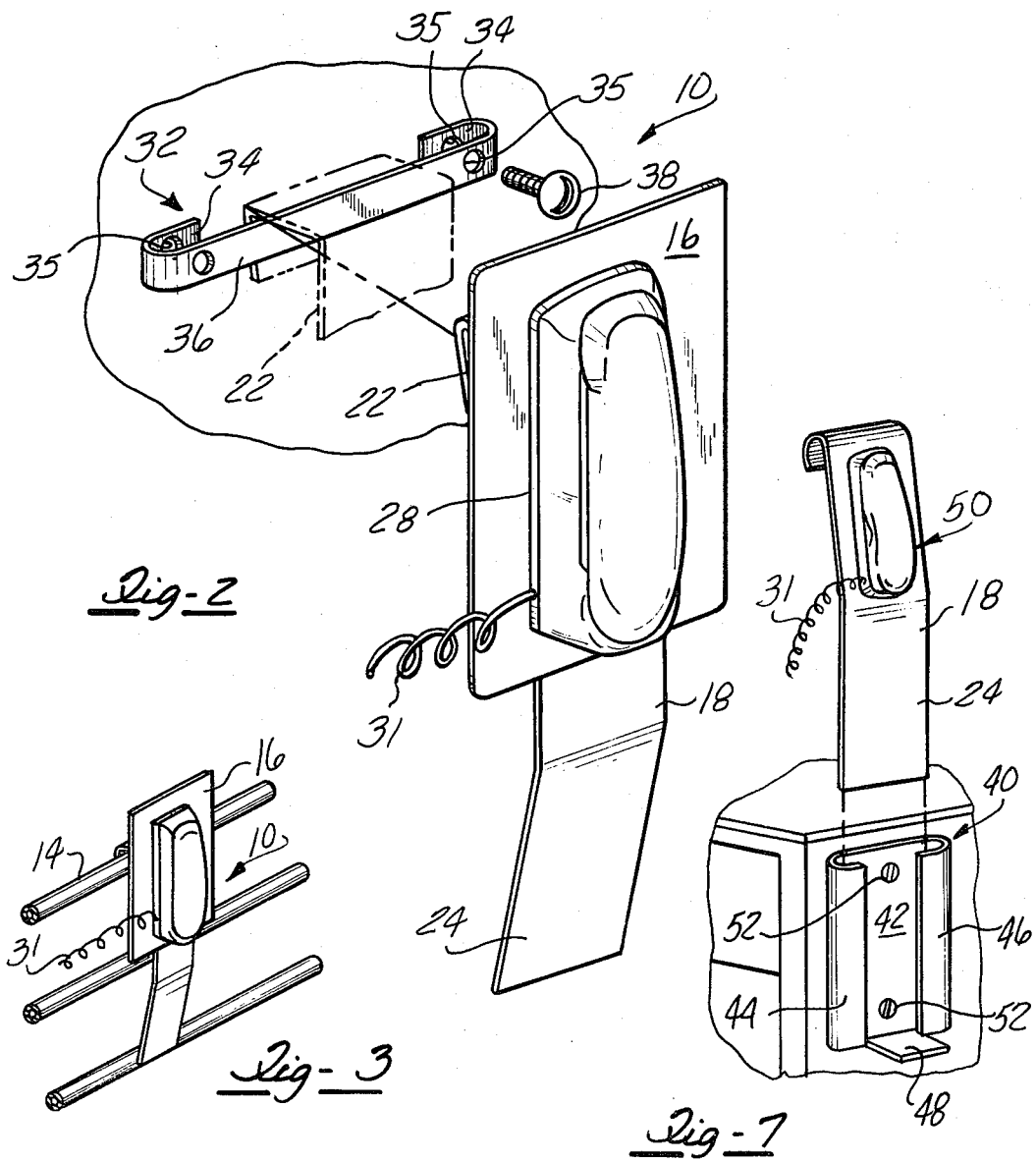

PORTABLE TELEPHONE SUPPORT

BACKGROUND OF THE INVENTION

I. Field of the Invention

The present invention generally relates to bed mounted devices to aid bedridden individuals. More particularly, the present invention is concerned with a portable telephone support for use by bedridden hospital patients.

II. Description of the Prior Art

In recent years there has been a trend on the part of hospitals to provide greater comfort and convenience to bedridden patients. One of the amenities now usually supplied to each patient by hospitals is a bedside telephone. Usually the telephone is placed on a bed side stand adjacent to the bed. This location makes it hard for the patient to reach the telephone, particularly if the patient is incapacitated in any way. Bed supported devices for the convenience of the patient and or the hospital staff are known. Included in the prior art are bed supported brackets for carrying articles of clothing, and bed supported brackets for carrying treatment related articles such as bottles. Examples of bed supported brackets in the prior art are disclosed in U.S. Pat. Nos. 118,791; 2,938,696; 3,653,624; and 4,203,175.

SUMMARY OF THE INVENTION

The present invention, which will be described in greater detail hereinafter, comprises a portable telephone support for use by hospital patients comprising a planar telephone base support of generally rectangular shape with a plurality of apertures formed therein, the apertures having a pattern complimentary to the mounting holes for the telephone base. A bedrail engaging hook is fixedly attached to a rear surface of the base. The hook comprises a continuous planar piece bent at an upper end to form a hook which is adapted to engage a bed side rail. A lower end of the hook is inclined outwardly to slidingly pass the edge of a mattress. A wall mounting bracket is provided to accommodate the portable telephone support when it is not mounted to the bed. In a preferred embodiment the wall mounting bracket is mounted high enough on the wall to lift the telephone cord from the floor and provide clearance for cleaning the floor. The portable telephone support may be mounted to the bed side rail with the telephone facing the center of the bed when the patient is in bed, or the portable telephone support may be mounted to the bed side rail with the telephone facing away from the bed for the convenience of the patient when the patient is seated in a chair adjacent to the bed. Also, the telephone support may be mounted to the foot of the bed or anywhere along the side rail of the bed. A pocket bracket is provided which, when attached to a bedside cabinet, supports the telephone at a convenient height above the cabinet for the patient.

It is therefore a primary object of the present invention to provide a new and improved portable telephone support for use by hospital patients.

It is a further object of the present invention to provide such a portable telephone support that can be mounted either to the side rail of a bed or mounted to a bracket attached to the wall.

It is yet another object of the present invention to provide a portable telephone support for use by hospital patients that may be mounted to a side rail of a bed with the telephone facing inward toward the bed for patients who are in bed or may be mounted to the side rail with the telephone facing outward from the bed for the convenience of a patient who may be sitting in a chair along side of the bed.

It is yet a further object of the present invention to provide a bedside cabinet supported pocket bracket that supports the telephone at a convenient height above the cabinet.

Further objects, advantages, and applications of the present invention will become apparent to those skilled in the art of bed supported apparatus when the accompanying description of one example of the best mode contemplated for practicing the invention is read in conjunction with the accompanying drawing.

BRIEF DESCRIPTION OF THE DRAWINGS

The description herein makes reference to the accompanying drawing wherein like reference numbers refer to like parts throughout the various several views, and wherein;

FIG. 1 illustrates a perspective view of the portable telephone support of the present invention mounted to the side rail of a hospital bed;

FIG. 2 is an enlarged perspective view of the portable telephone support of the present invention mounted on a bracket attached to a wall adjacent to the bed;

FIG. 3 is a broken perspective view of the portable telephone support of the present invention with the support mounted on the side rail of the bed with the telephone facing away from the bed;

FIG. 7 is a broken perspective view of the portable telephone support supported by a pocket bracket mounted to a bedside cabinet.

DESCRIPTION OF THE PREFERRED EMBODIMENT

Figure 4:
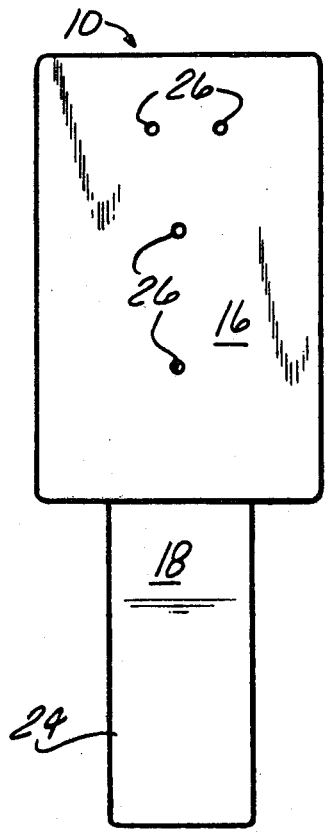
FIG. 4 is a front elevational view of the portable telephone support of the present invention.

Referring now to the drawing, there is illustrated in FIG. 1 one example of the present invention in the form of a portable telephone support 10. As shown in FIG. 1 of the drawing the telephone support 10 is adapted to be supported by a hospital bed 12, and is carried by a side rail 14, in a manner which will be described in greater detail hereinbelow.

Figure 5:
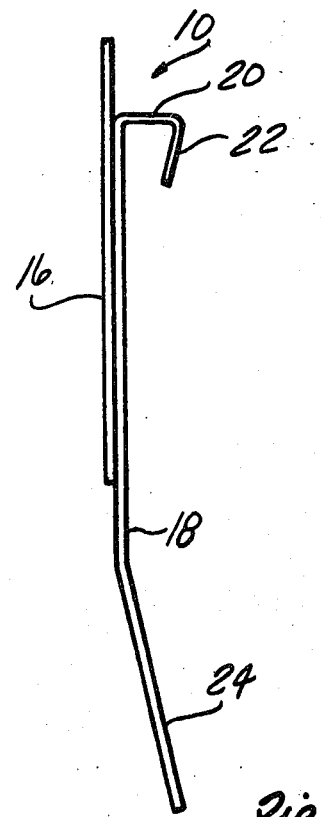
FIG. 5 is a side view of the portable telephone support of FIG. 4.
Figure 6:
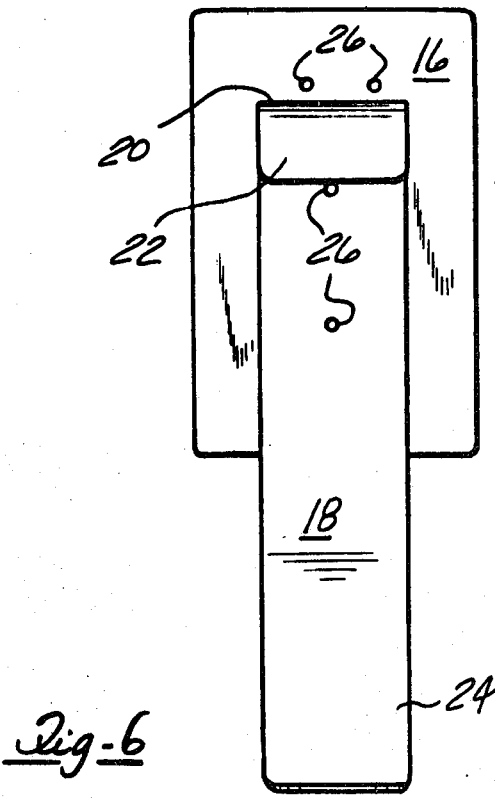
FIG. 6 is a rear view of the portable telephone support of the portable telephone support of FIG. 4.

As shown in FIGS. 4, 5, and 6 of the drawing, the portable telephone support 10 comprises a telephone base support 16 and a bedrail engaging hook 18 secured to a rear surface of the telephone base support 16. The hook 18 may be secured to the base 16 by adhesives or suitable threaded fasteners. The hook 18 comprises a continuous planar piece bent at an upper end 20 to form a catch 22 for releasably snap engaging the bed side rail 14. A lower end 24 of the bedrail engaging hook 18 is inclined out of the plane of the telephone support base 16 to pass the edge of a mattress without interference. The base 16 and hook 18 may also be formed in a single piece by an injection moulding process.

The telephone base support 16 includes a plurality of apertures 26 formed therein. The apertures 26 have a pattern complimentary to the mounting holes for a telephone base 28, (FIG. 2) and a plurality of threaded fasteners (not shown) are utilized to mount the telephone base 28 to the base support 16. In the case of telephones having a sufficiently small base, such as the "TRIMLINE" telephone, the telephone support base 16 may be eliminated and the telephone mounted directly to the bed engaging hook 18 as shown in FIG. 7 of the drawing.

As shown in FIG. 2, a bracket 32 is provided for supporting the portable telephone support 10 against the wall of the room when it is not mounted to the bed side rail 14. The bracket 32 comprises a pair of wall abutting ends 34 with a hook engaging portion 36 spaced from the wall and extending between the wall abutting ends 34. A pair of aligned apertures 35 are formed in each wall abutting end 34 and the hook engaging portion 36 to accommodate a screw 38 for mounting the bracket 32 to the wall. Preferably, the bracket 32 is sufficiently long to accommodate two phones from adjacent beds.

As shown in FIG. 1 of the drawing, the portable telephone support 10 may be mounted with the telephone facing the bed 12, or as shown in FIG. 3 of the drawing, the telephone may be mounted with the telephone facing outward from the bed 12 for the convenience of a patient who may be seated in a chair alongside the hospital bed 12.

FIG. 7 illustrates a pocket bracket 40 that is mounted to a bedside cabinet. The pocket bracket 40 supports the telephone above the cabinet locating the telephone in a more convenient location for a bed-ridden patient. The pocket bracket 20 comprises a cabinet abutting wall 42 and a pair of opposed sides 44, 46 formed by curving the opposed sides of wall 42 outward then inward in an arcuate manner. The arcuate sides 44, 46 are spaced from the wall 42 a small distance to slidingly receive the lower end 24. A ledge 48 extends outward from a lower end of the wall 42 to provide a support for the lower end 24 of the bedrail engaging hook 18. The pocket bracket 40 may be mounted to the bedside cabinet using a suitable adhesive or utilizing screws 52. As shown in FIG. 7, if a sufficiently small telephone 50 is available, the telephone support base 16 may be eliminated and the telephone base mounted directly on the hook support 16.

It can thus be seen that the present invention has provided a new and improved portable telephone support for the use of hospital patients. It can also be seen by the skilled artisan that the portable telephone support of the present invention is simple in design and easy and economical to manufacture.

It should be understood by those skilled in the art of bed mounted devices that other forms of the Applicant's invention may be had all coming within the spirit of the invention and the scope of the appended claims.

Having thus described my invention what I claim is:

1. A portable telephone support for use by hospital patients in a bed having a side rail and a mattress comprising:
    a telephone base support;
    a bedrail engaging hook member secured to the telephone base support, the bed rail engaging member including a continuous planar piece bent at an upper end to form a hook for engaging the side rail of the bed and a lower end inclined out of the plane of the bedrail engaging member to pass the edge of the mattress without interference when the bedrail engaging member is mounted on the side rail of the bed facing the mattress; and
    means for selectively mounting the telephone base support to a wall and a support surface spaced from the bed side of the rail of the bed, the mounting means comprising:
    a mounting bracket having a support surface engaging portion and an outer portion joined to and spaced from the support surface engaging portion to define an aperture therebetween for receiving the bedrail engaging member therein.

2. The portable telephone support as defined in claim 1 wherein the means for selectively mounting the telephone to the support surface and the side rail of the bed comprises:
    a bracket mounted on the support surface, the bracket comprising a pair of support surface abutting ends, a hook engaging portion spaced from the support surface and extending between the support surface abutting ends, an aperture formed in each support surface abutting end, and a pair of support surface engaging mounting screws passing through the apertures to mount the bracket on the support surface; and
    wherein the hook of bedrail engaging member may selectively engage the bed side rail or the bracket.

3. The portable telephone support of claim 1 wherein the telephone base support comprises:
    a rectangular shaped planar member having a plurality of apertures formed therein, the apertures being complimentary to the hole pattern of a wall mounted telephone.

4. A portable telephone support for use by hospital patients in a bed having a side rail and a mattress comprising:
    a planar telephone base support having a plurality of apertures formed therein, the apertures having a pattern complimentary to the mounting holes for a wall mounted telephone base;
    a bedrail engaging hook fixedly attached to the base support, the bedrail engaging hook comprising a continuous planar piece bent at an upper end to form a hook and inclined at a lower end out of the plane of the planar piece to slidingly pass the edge of the mattress;
    a support surface mounting bracket comprising a wall abutting portion, a hook engaging portion spaced from the wall abutting portion, at least one aperture formed in the wall abutting portion, and means for engaging the aperture to threadingly mount the the bracket to the support surface; and
    wherein the bedrail engaging hook is adapted to releasably engage the support surface mounting bracket to selectively mount the portable telephone support on the support surface and the side rail of the bed.

5. The portable telephone support as defined in claim 1 wherein the mounting means includes a pocket bracket for supporting the bedrail engaging hook comprising:
    a support surface abutting wall including a pair of opposed arcuate sides formed by curving opposed sides of support surface abutting wall outward and then inward in an arcuate manner, the arcuate sides being spaced from the support surface abutting wall to slidingly receive the lower end of the telephone base support;
    a ledge projecting outward from a lower end of the support surface abutting the wall to abut and support the lower end of the telephone base support; and means for securing the pocket bracket to a support surface.

6. A portable telephone support for use by hospital patients in a bed having a side rail and a mattress comprising a bedrail engaging member, the bedrail engaging member including a continuous planer piece bent at an upper end to form a hook for engaging the side rail of the bed and a lower end inclined out of the plane of the bed engaging member to pass the edge of the mattress without interference when the bedrail engaging member is mounted on the side rail of the bed facing the mattress; and a pocket bracket for supporting the bedrail engaging hook comprising:

a support surface abutting wall including a pair of opposed arcuate sides formed by curving opposed sides of the support surface abutting wall outward and then inward in an arcuate manner, the arcuate sides being spaced from the support surface abutting wall to slidingly receive the lower end of the bedrail engaging hook;

a ledge projecting outward from a lower end of the support surface abutting the wall to abut and support the lower end of the telephone base support; and means for securing the pocket bracket to a support surface.

* * * * *

UNITED STATES PATENT OFFICE
CERTIFICATE OF CORRECTION

Patent No. 4,432,522                    Dated February 21, 1984

Inventor(s) Bazella G. Rainey, III, Thomas F. Pruente and Anna Tamargo

It is certified that error appears in the above-identified patent and that said Letters Patent are hereby corrected as shown below:

[75] Inventors: should read,

-- Thomas F. Pruente and Anna Tamargo, both of Pontiac, Mich., Bazella G. Rainey, III, of Ferndale, Mich. --.

Signed and Sealed this

Twenty-first Day of August 1984

[SEAL]

Attest:

GERALD J. MOSSINGHOFF

Attesting Officer    Commissioner of Patents and Trademarks